United States Patent [19]

Philippe et al.

[11] Patent Number: 4,859,006
[45] Date of Patent: Aug. 22, 1989

[54] HYDROPNEUMATIC JACK

[75] Inventors: Joseph Philippe, Carpentras; Jean-Michel Perrochat, Montrouge, both of France

[73] Assignee: S.A.M.M. - Societe d'Applications des Machines Motrices, Bievres, France

[21] Appl. No.: 213,563

[22] Filed: Jun. 30, 1988

[30] Foreign Application Priority Data

Jul. 3, 1987 [FR] France ................. 87 09497

[51] Int. Cl.$^4$ ............................................. B62D 55/30
[52] U.S. Cl. ........................................ 305/10; 305/31; 267/64.13; 267/64.26
[58] Field of Search ............. 305/10, 29, 31, 32; 180/9.1; 188/269; 267/64.11, 64.13, 64.26, 113; 474/101, 109, 138; 92/61, 65, 113

[56] References Cited

U.S. PATENT DOCUMENTS

| 2,753,036 | 7/1956 | Joy ......................... 198/10 |
| 3,304,076 | 2/1967 | Doversberger ......... 267/64.25 |
| 3,539,229 | 11/1970 | Scully ..................... 305/10 |
| 3,656,632 | 4/1972 | Karakashian et al. ... 267/64.25 X |
| 3,853,311 | 12/1974 | Kreuzer et al. ........ 267/64.26 |
| 3,944,198 | 3/1976 | Sakamoto ............... 267/64.26 |
| 4,029,306 | 6/1977 | Sakaguchi et al. ..... 267/64.26 X |
| 4,381,857 | 5/1983 | Cook ...................... 267/64.26 X |
| 4,470,583 | 9/1984 | Peiffer et al. ......... 305/10 X |
| 4,506,869 | 3/1985 | Masclet et al. ........ 188/269 X |

FOREIGN PATENT DOCUMENTS

| 1918087 | 10/1970 | Fed. Rep. of Germany . |
| 1630118 | 7/1971 | Fed. Rep. of Germany . |
| 2358386 | 6/1975 | Fed. Rep. of Germany . |
| 1243327 | 8/1960 | France .................. 267/64.26 |
| 1514404 | 1/1967 | France . |
| 2145778 | 2/1973 | France . |

Primary Examiner—Russell D. Stormer
Attorney, Agent, or Firm—Sughrue, Mion, Zinn, Macpeak & Seas

[57] ABSTRACT

The hydropneumatic jack comprises a tubular body (14) closed at one end and open at the other end. A hollow rod (9) is slidably mounted in the body (14) in a sealed manner and in the rod is formed a first chamber (18) containing a freely slidable piston (19) which divides the chamber into two compartments (18a, 18 b) which are sealed off from each other, a second chamber (23) being defined between a transverse end wall (21) constituting the end of the hollow rod (9) and the inner wall of the body (14). The transverse end wall (21) is provided with a nozzle (22) putting the second chamber (23) in communication with the neighbouring compartment (18b) of hollow rod (9). The compartment (18b) and the second chamber (23) are filled with a hydraulic liquid under pressure and the second compartment (18a) is filled with a pressurized gas. This jack automatically and instantaneously corrects the decreases in tension of the track (1) in the static state, subsequent to wear or expansion of the track and rollers.

5 Claims, 2 Drawing Sheets

HYDROPNEUMATIC JACK

The present invention relates to a hydropneumatic jack of utility in particular in articulated tracked vehicles, such as building-site machines or small tracked vehicles for packing snow on ski runs, this jack being adapted to ensure a suitable tension of the track.

It is known to maintain the tension of the track by means of a hydraulic jack articulated on one hand to a tension arm of a tension pulley located on the upper end of the track and on the other hand to the chassis of the vehicle or to the suspension arm of the first roller mounted in this track. This device is completed by an "active" control system equipped with a control unit employing a microprocessor which detects the drops in tension of the track and sends corresponding orders to the jack for reestablishing the tension.

This device is heavy, complex and costly, and above all is not really satisfactory owing to the excessive response time between the detection of the slack in the track and the carrying out of the order by the jack. Consequently, the track is practically not re-tensioned in fact within the required time and the first roller is often bottoming and subjected to excessive forces.

A track tensioner is also known which is controlled in the "passive" way and relates the movements of the first roller to those of the tension pulley which mechanically ensures a correct tension of the front reach of the track. This tension is given by a mechanical jack or a greaseoperated jack set to a corresponding distance between axes. However, this passive tensioner does not permit taking into account secondary parameters which have a disadvantageous effect on the tension of the track: movements of the other rollers, wear of the latter, wear of the track, and thermal expansion of these elements.

Consequently, the jack must be frequently adjusted if a correct tension of the track is to be maintained.

An object of the invention is therefore to provide a hydropneumatic jack of the passively controlled type arranged in such manner that it automatically maintains a correct track tension without need for an adjusting intervention.

The invention provides a hydropneumatic jack comprising a tubular body closed at one end and open at the opposite end, a hollow rod slidably mounted in the body in a sealed manner and in which rod is formed a first chamber containing a freely slidable piston which divides the chamber into two compartments sealed off from each other, a second chamber being defined between a transverse end wall constituting the end of the hollow rod and the inner end wall of the body, said transverse end wall being provided with a nozzle which puts the second chamber in communication with the neighbouring compartment of the hollow rod, said compartment and said second chamber being filled with a hydraulic liquid under pressure and the second compartment being filled with a pressurized gas.

According to the invention, this jack comprises a tubular case closed by an end wall at one end and open at the opposite end in which the body is slidable in a sealed manner, so that a third chamber, filled with grease, is reserved between the end wall of the case and a transverse end wall closing the end of the body.

Under these conditions, when the static tension of the track decreases, for example owing to the expansion or wear of the track, or the movements of the rollers, the rod slides in the body and the hydraulic pressure between the two compartments is unbalanced. The freely slidable piston is then automatically urged by the pressure of the gas, the hydraulic liquid slowly flowing from one compartment to the other through the aforementioned nozzle. The hdyraulic pressure is consequently re-established at the same level and the correct tension of the track is maintained in a substantially static manner.

Further features and advantages of the invention will be apparent from the following description with reference to the accompanying drawing which illustrates two embodiments of the invention by way of non-limitative examples, in which.

Figure 1:
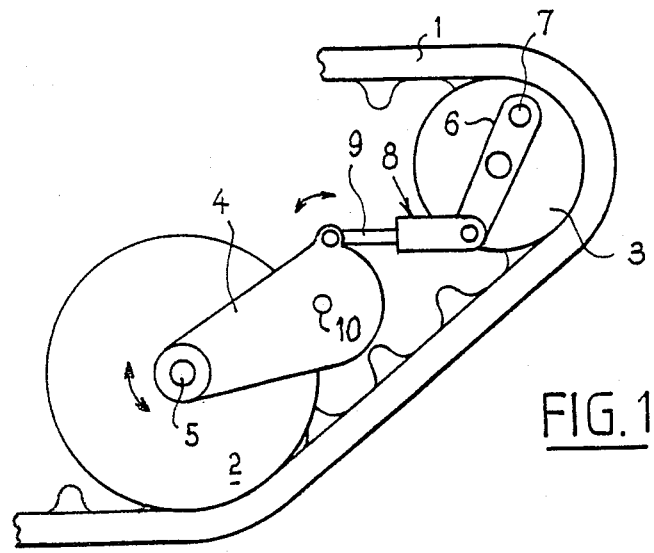
FIG. 1 is a partial longitudinal elevational view of the front of a vehicle articulated track equipped with a hydropneumatic jack device according to the invention.

Shown in FIG. 1 is the front part of an articulated track of a vehicle such as a public works machine or a tracked vehicle for compacting snow on ski runs. The track 1 surrounds a number of rollers of which only the first roller 2 located in the front is shown, and a tension pulley 3 for the track 1 located above the roller 2. The latter is provided with a suspension arm 4 articulated to a spindle 5 of the roller 2 and to a pivot 10 connected to the chassis. The pulley 3 is provided with a tension arm 6 which is fixed to the pulley and has one end articulated to a pivot 7 fixed to the body of the vehicle and an opposite end articulated to a hydropneumatic jack 8 whose rod 9 is articulated to the suspension arm 4.

Figure 2:
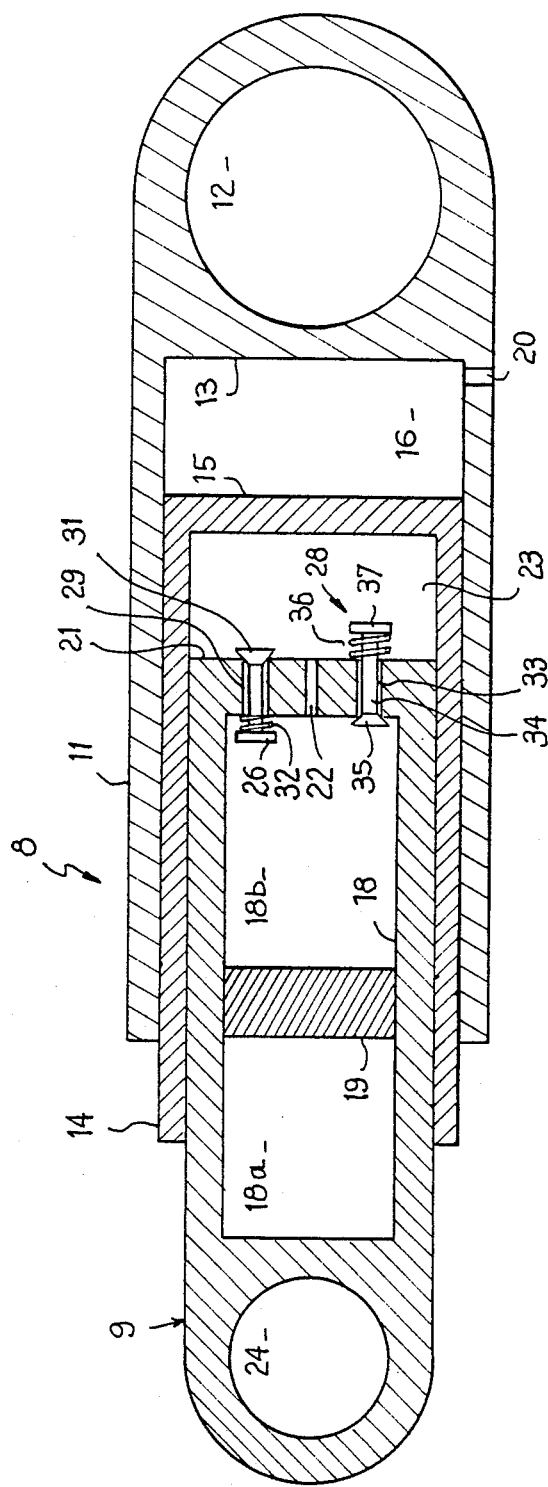
FIG. 2 is an axial sectional view of a first embodiment of the hydropneumatic jack according to the invention.

In the embodiment shown in FIG. 2, the jack 8 comprises a tubular case 11 one end of which has an opening 12 for articulating the case to the corresponding end of the tension arm 6. The case 11 is closed by an end wall 13 adjacent to the opening 12 and open at its opposite end. Slidable in the case 11 is a tubular body 14 which is closed at one end by a transverse wall 15 and open at its opposite end, this body 14 being so positioned in the case 11 as to leave a sealed chamber 16 filled with grease between the end walls 13 and 15. The hollow rod 9 is slidably mounted in the body 14 in a sealed manner and there is formed in this rod 9 a longitudinal chamber 18 containing a freely slidable piston 19 which divides the chamber into two compartments 18a, 18b which are sealed off from each other. The end of the rod defining the compartment 18b is constituted by a transverse end wall 21 provided with a nozzle 22 which is preferably axially disposed and has a very small diameter. The nozzle 22 therefore puts the compartment 18b in communication with a chamber 23 left between the end wall 15 of the body 14 and the end wall 21 of the rod 9. The compartment 18b and the chamber 23 are filled with a hydraulic liquid (oil) and the compartment 18a is filled with a gas such as nitrogen, this gas and the hydraulic liquid being at suitable pressure.

The transverse end wall 21 of the hollow rod 9 is provided with a pressure reducing valve 26 (by-pass) which extends through a bore 29 in the end wall 21, the head 31 of the valve within the chamber 23 being normally maintained applied against its seat by a spring 32 which exerts a thrust on the end 26 of the stem opposed to the valve 31 and bears against the end wall 21.

The end wall 21 is provided with a safety valve 28 which extends through an axial bore 33 in this end wall. The valve 28 is formed by a stem 34 whose head 35, located in the compartment 18b of the rod 9, is normally biased against its seat in a position for closing the bore 33, by a coil spring 36 coaxial with the stem 34. The spring 36 is located in the chamber 23, bears against the end wall 21 and biases the end 37 of the stem 34 toward the interior of the chamber 23, i.e. in the direction for closing the bore 33 by means of the head 35.

The end of the rod 9 outside the body 14 is provided with an eye 24 for articulating the rod to the suspension arm 4.

The hydropneumatic jack just described operates in the following manner:

This jack 8 acts as a link between the tension arm 6 and the suspension arm 4. The static tension of the track 1 is adjusted by injection of grease into the chamber 23 through a nozzle 20 in the case 11. Corresponding to the value of this static tension is a given distance between the axes of the articulation points of the jack 8 on the arms 4 and 6, and corresponding pressures of the gas in the compartment 18a and of the hydraulic liquid in the compartment 18b and the chamber 23.

As a result of a gradual wear of the rollers and track or a large thermal expansion of the track, the static tension of the latter decreases. This drop in tension results in a slight extension of the jack 8, the rod 9 moving slightly out of the body 14 (to the left as viewed in FIG. 2). Consequently, the volume of the chamber 23 increases and a small amount of hydraulic liquid passes through the nozzle 22 into the chamber 23 so that the hydraulic pressure is again balanced between the compartment 18b and the chamber 23. The gas under pressure (for example nitrogen) in the compartment 18a automatically and instantaneously shifted the piston 19 toward the nozzle 22, which re-established the hydraulic pressure in the chamber 23 and the compartment 18b.

Each drop in tension of the track 1 at the front of the vehicle is therefore immediately and automatically compensated without necessity to proceed to any intervention on the jack. The nozzle 22 dynamically renders the jack 8 rigid and permits the corrections in the tension in a substantially static operation without loss in the pressure force, as is the case in known devices, which constitutes a considerable advantage.

Furthermore, in the case of wobble of the track 1 tending to lengthen it, the volume of the chamber 23 increases so that its hydraulic pressure decreases. This drop in pressure opens the by-pass valve 26 and causes the oil to flow rapidly into the pressure reducing chamber 23 under the pressure of the gas contained in the compartment 18a.

In the event of a sudden shock of the tension pulley 3 against an obstacle, or of a prohibitive track tension, the sudden hydraulic overpressure created in the chamber 23 causes the opening of the safety valve 28 in opposition to the force exerted by the spring 36. This re-establishes the balance of the hydraulic pressures in the compartment 18b and chamber 23.

The valve 28 therefore avoids destructive hydraulic pressures or forces liable to burst the jack.

The presence of the grease chamber 16 affords the following important advantage:

In the case of an intervention needed on the rolling set (changing the track or the rollers), the tension of the track must be released. The grease of the chamber 16 is then emptied through the orifice 20, which permits contracting the jack and releasing the track. When the considered operation has been carried out (re-assembly of the track), the track 1 is re-tensioned by introducing grease under pressure into the chamber 16 by way of the orifice 20.

This re-tensioning of the jack may be carried out by means of a grease gun which is part of the equipment on board the vehicle. Moreover, as the grease has a static function, any possible pollution of the freshly-introduced grease has no effect on the operation of the tensioner. This would not be so with the embodiment shown in FIG. 3 which would require a pollution-free environment (previously filtered non-polluted oil for the chamber 23), which is practically impossible on board a vehicle on the terrain.

Figure 3:
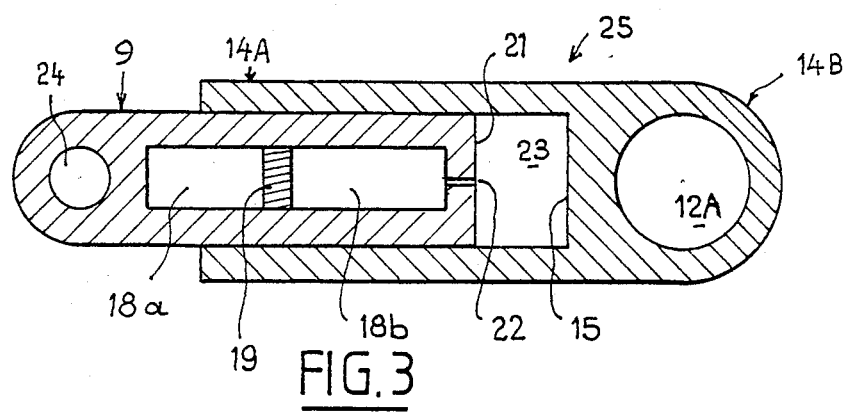
FIG. 3 is a view similar to FIG. 2 of a modification of the construction of the hydropneumatic jack.

The second embodiment of the jack 25 illustrated in FIG. 3 differs from the preceding embodiment in that the jack 25 does not have an outer case 11 and consequently does not have a grease chamber. Its articulation to the tension arm 6 is therefore ensured by the end 14B of the tubular body 14A in which an opening 12A is provided for this purpose. Indeed, the presence of the outer case 11 and grease chamber 16 is not essential in certain utilizations.

It will be understood that the jack 8 or 25 may be mounted with its rod 9 articulated to the tension arm 6 and its case 11 or its body 14A articulated to the suspension arm 4.

The hydropneumatic jack according to the invention is of very simple construction and consequently inexpensive while it affords the advantage of permitting an automatic and instantaneous correction of diminished tension of the track.

We claim:

1. A hydropneumatic jack for articulated tracked vehicles, said device comprising a tubular body having a closed transverse end and an open end opposite the closed end, a hollow rod which is slidably mounted in the body in a sealed manner and defines a first chamber containing a freely slidable piston which divides the chamber into two compartments which are sealed off from each other, the hollow rod having a transverse end wall, a second chamber being defined between the transverse end wall of the hollow rod and the closed transverse end of the body, said transverse end wall being provided with a nozzle which puts the second chamber in communication with a neighbouring compartment of said two compartments of the hollow rod, a hydraulic liquid under pressure filling said neighbouring compartment and said second chamber, and a pressurized gas filling a second compartment of said two compartments, said jack further comprising a tubular case having a closed end wall and being pen at an opposite end of the case, the body being slidable in the case in a sealed manner, a third chamber being defined between the closed end wall of the case and the transverse end of the body, and grease filling the third chamber.

2. Hydropneumatic jack according to claim 1, wherein the rod has an end portion extending outside the body and the end portion of the rod and the closed end wall of the case are adapted to be articulated to supports.

3. Hydropneumatic jack according to claim 1, comprising in the transverse end wall of the hollow rod a valve capable of opening in the event of a drop in the hydraulic pressure in the second chamber so as to permit a rapid passage of said hydraulic liquid from said neighbouring compartment of the body into said second chamber.

4. Hydropneumatic jack according to claim 3, comprising in the transverse end wall of the hollow rod a safety valve and a spring cooperative with the safety valve and biasing the safety valve so as to normally maintain it in a closed position, the safety valve being arranged in such manner that a sudden hydraulic overpressure in said second chamber opens the valve in opposition to the action of the spring and allows the passage of the hydraulic liquid from said second chamber into said neighbouring compartment in the hollow rod.

5. A vehicle comprising a body, an articulated track, rollers mounted on the body and rollingly carrying said track, a tension pulley cooperative with the track for maintaining a given tension of the track, a suspension arm articulated to the body and supporting one of said rollers, a tension arm articulated to the body and carrying the tension pulley, and a hydropneumatic jack interposed between the suspension arm and the tension arm, said hydropneumatic jack comprising a tubular body having a closed transverse end and an open end opposite the closed end, a hollow rod which is slidably mounted in the body in a sealed manner and defines a first chamber containing a freely slidable pistion which divides the chamber into two compartments which are sealed off from each other, the hollow rod having a transverse end wall, a second chamber being defined between the transverse end wall of the hollow rod and the closed transverse end of the body, said transverse end wall being provided with a nozzle which puts the second chamber in communication with a neighbouring compartment of said two compartments of the hollow rod, a hydraulic liquid under pressure filling said neighbouring compartment and said second chamber, and a pressurized gas filling a second compartment of said two compartments, said jack further comprising a tubular case having a closed end wall and being open at an opposite end of the case, the body being slidable in the case in a sealed manner, a third chamber being defined between the closed end wall of the case and the transverse end of the body, and grease filling the third chamber, said rod having an end portion which is opposed to said transverse end wall of the rod and extends out of the body and being articulatd to one of said two arms and the closed end wall of the case being articulated to another of said two arms.

* * * * *